US012103675B2

(12) United States Patent
Ahn

(10) Patent No.: US 12,103,675 B2
(45) Date of Patent: *Oct. 1, 2024

(54) PROPELLER-ENCLOSED AIRLIFTING AIR TUBE APPARATUS INCORPORATING AN AIRFLOW CONTROL DISH-BASED STEERING UNIT

(71) Applicant: Youngsub Ahn, Santa Clara, CA (US)

(72) Inventor: Youngsub Ahn, Santa Clara, CA (US)

( * ) Notice: Subject to any disclaimer, the term of this patent is extended or adjusted under 35 U.S.C. 154(b) by 100 days.

This patent is subject to a terminal disclaimer.

(21) Appl. No.: 17/956,344

(22) Filed: Sep. 29, 2022

(65) Prior Publication Data

US 2024/0109654 A1     Apr. 4, 2024

(51) Int. Cl.
| | | |
|---|---|---|
| *B64C 29/04* | (2006.01) | |
| *B60L 50/60* | (2019.01) | |
| *B64C 1/00* | (2006.01) | |
| *B64C 11/00* | (2006.01) | |
| *B64C 39/02* | (2023.01) | |
| *B64D 27/24* | (2006.01) | |
| *B64D 35/06* | (2006.01) | |
| *B64D 35/08* | (2006.01) | |
| *B64U 20/60* | (2023.01) | |
| *B64U 20/75* | (2023.01) | |

(Continued)

(52) U.S. Cl.
CPC ............. *B64C 29/04* (2013.01); *B60L 50/66* (2019.02); *B64C 1/00* (2013.01); *B64C 11/001* (2013.01); *B64C 39/024* (2013.01); *B64D 27/24* (2013.01); *B64D 35/06* (2013.01); *B64D 35/08* (2013.01); *B64U 20/60* (2023.01); *B64U 20/75* (2023.01); *B64U 30/294* (2023.01); *B64U 50/14* (2023.01); *G05D 1/0016* (2013.01); *B60L 2200/10* (2013.01); *B64C 2001/0081* (2013.01); *B64U 30/20* (2023.01); *B64U 50/19* (2023.01); *B64U 2201/20* (2023.01)

(58) Field of Classification Search
CPC . B64C 29/04; B64C 2001/004; B64C 11/001; B64U 20/75; B64U 30/294; B64U 50/14; B64U 10/20; B64U 30/24; B64U 30/26; B64U 50/18

See application file for complete search history.

(56) References Cited

U.S. PATENT DOCUMENTS 10,579,074 B2 *   3/2020   Ahn ..................... G05D 1/0011

\* cited by examiner

*Primary Examiner* — Timothy D Collins
*Assistant Examiner* — Justin Michael Heston
(74) *Attorney, Agent, or Firm* — Invent Capture, LLC.; Samuel S. Cho

(57) ABSTRACT

A propeller-enclosed airlifting air tube apparatus contains a unique multi air-tube structure that functions as a plurality of air outtakes to produce stable lift force with one or more propellers enclosed in the apparatus. By encapsulating the propellers within the outer shells, the airlifting air tube apparatus is able to reduce potential bodily harm and property damage risks during a flight operation in a densely-populated environment or in another environment involving tight spaces. The airlifting air tube apparatus encapsulates one or more pairs of contra-rotating propellers inside a drone casing to enhance operational safety while minimizing the overall footprint of the apparatus. Furthermore, the airlifting air tube apparatus incorporates a novel airflow control dish-based flight control steering unit configured to change directions and altitudes of the apparatus by dynamically adjusting the airflow to each outtake air tube with the airflow control dish.

9 Claims, 8 Drawing Sheets

A Lateral View of an Airflow Control Dish-Based Steering Unit in a Novel Airlifting Air Tube Apparatus

(51) Int. Cl.
*B64U 30/294* (2023.01)
*B64U 50/14* (2023.01)
*G05D 1/00* (2024.01)
*B64U 30/20* (2023.01)
*B64U 50/19* (2023.01)

A Top Exterior View of an Embodiment of a Novel Airlifting Air Tube Apparatus

100

An Interior View of an Embodiment of a Novel Airlifting Air Tube Apparatus

200

An Example of Controlled Steering of a Novel Airlifting Air Tube Apparatus By Varying Outtake Airflows Among a Plurality of Air Tubes

300

A Lateral View of an Airflow Control Dish-Based Steering Unit in a Novel Airlifting Air Tube Apparatus

400

An Embodiment of an Airflow Control Dish-Based Steering Unit Controlled by Dish-Positioning Motors, Dish Control Rods, and/or Springs

500

A Top-Down Interior View of the Novel Airlifting Air Tube Apparatus Integrating an Airflow Control Dish

600

A Bottom-Up View of an Airflow Control Dish in a Neutral Hovering Position for the Novel Airlifting Air Tube Apparatus

700

A Perspective Bottom-Up View of an Airflow Control Dish Integrated in the Airflow Control Dish-Based Airlifting Air Tube Apparatus

800

PROPELLER-ENCLOSED AIRLIFTING AIR TUBE APPARATUS INCORPORATING AN AIRFLOW CONTROL DISH-BASED STEERING UNIT

BACKGROUND OF THE INVENTION

The present invention generally relates to a flying apparatus. More specifically, the present invention relates to various embodiments of a novel propeller-enclosed and air tube-based airlifting apparatus that incorporates an airflow control dish-based steering unit.

As mobile multimedia communications methods and mechatronic control systems have become more sophisticated yet cheaper in recent years, autonomous or remote-controlled flying apparatuses, also known as "drones," have experienced a significant market expansion from specialty aeronautics and military applications to general consumer electronics for casual consumer utilizations. Drones that were out of reach for average consumer electronics purchase budgets many years ago are becoming dramatically inexpensive and affordable.

Empowered in part by today's increasingly-ubiquitous access to broadband wireless communication technology and real-time multimedia (e.g. video, audio, etc.) transmission capabilities, consumers are finding a myriad of potential uses for inexpensive drones available in the consumer electronics market. For example, today's consumers utilize drones for unmanned video recording, surveillance, advertising, and real-time multimedia broadcast.

As some of the drone applications involve indoor use or navigation through tight spaces, conventional drone designs with exposed propellers are substantial safety risks to humans, animals, and properties. High-velocity rotating propellers can harm, injure, or damage people, animals, and properties, if propeller blades accidentally come into contact with external objects. Despite these safety risks inherent in indoor or tight-spaces drone usage, conventional drone designs typically expose one or more propellers in open air, thus posing substantial danger to public safety as consumer applications of drone usage continue to grow exponentially in the future.

Therefore, it may be advantageous to provide a novel structure for a flying apparatus that reduces potential bodily harm and property damage risks during an operation of the flying apparatus in a densely-populated environment or in another environment involving tight spaces. Furthermore, it may also be advantageous to provide a novel flying apparatus that encapsulates one or more propellers inside a drone casing to enhance operational safety. Moreover, it may also be advantageous to provide a safety-enhancing and unique multi air-tube structure incorporated into the drone casing as air outtakes to produce stable lift force with the encapsulated propellers. In addition, it may also be advantageous to provide a novel airflow control dish-based flight control steering unit that controls direction and altitude of the novel flying apparatus.

SUMMARY

Summary and Abstract summarize some aspects of the present invention. Simplifications or omissions may have been made to avoid obscuring the purpose of the Summary or the Abstract. These simplifications or omissions are not intended to limit the scope of the present invention.

In one embodiment of the invention, an airlifting air tube apparatus is disclosed. This airlifting air tube apparatus comprises: (1) one or more propellers connected to one or more propeller motors, all of which are encapsulated by an exterior shell of the airlifting air tube apparatus, wherein the one or more propeller motors are configured to rotate the one or more propellers; (2) a flight control circuitry configured to control rotational speeds and rotating orientations of the one or more propellers; (3) an air intake path physically defined by an air intake opening on the exterior shell and an internal air passage leading to the one or more propellers encapsulated inside the airlifting air tube apparatus; (4) three or more outtake air tubes located on a bottom surface of the airlifting air tube apparatus, wherein the three or more outtake air tubes expel air drawn in and agitated by the one or more propellers and provide a sufficient lift force to enable the airlifting air tube apparatus to operate as a controlled flying device, and wherein adjusting a magnitude of expelled air in each of the three or more outtake air tubes triggers a change in direction or altitude during flight; and (5) an airflow control dish-based steering unit comprising an airflow control dish and a dish-guiding rail embedded in each outtake air tube, wherein the airflow control dish is configured to move along an axis of movement guided by the dish-guiding rail embedded in each outtake air tube to reduce or increase the magnitude of expelled air in each of the three or more outtake air tubes, which in turn provides a controlled steering of the airlifting air tube apparatus.

DETAILED DESCRIPTION

Figure 1:
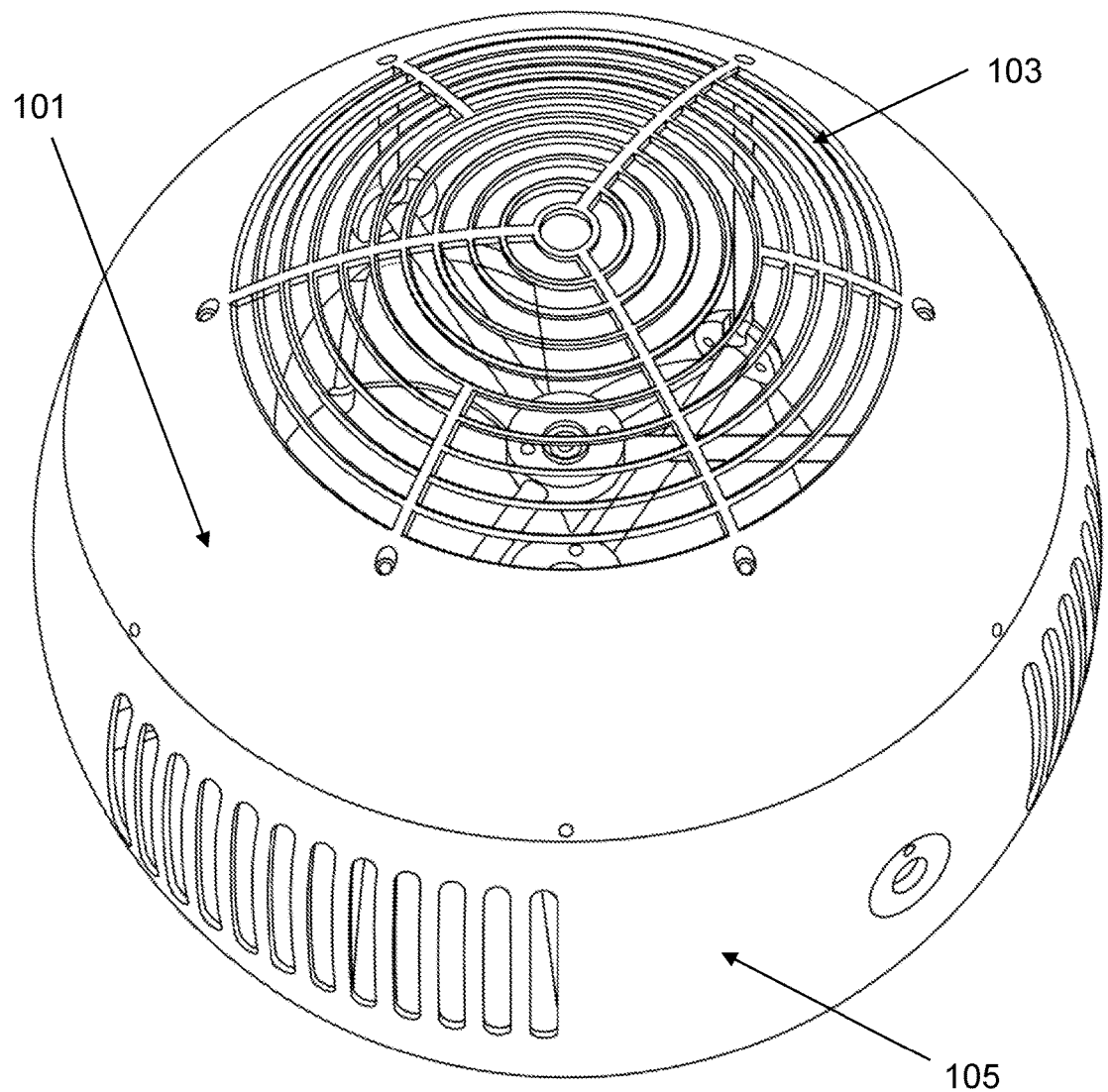
FIG. 1 shows a top exterior view of a novel airlifting air tube apparatus, in accordance with an embodiment of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention.

However, it will be apparent to one of ordinary skill in the art that the invention may be practiced without these specific details. In other instances, well-known features have not been described in detail to avoid unnecessarily complicating the description.

The detailed description is presented largely in terms of description of shapes, configurations, and/or other symbolic representations that directly or indirectly resemble one or more airlifting air tube apparatuses incorporating an airflow control dish-based steering unit that can be part of a flying apparatus or a drone, in accordance with an embodiment of the invention. These process descriptions and representations are the means used by those experienced or skilled in the art to most effectively convey the substance of their work to others skilled in the art.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment. Furthermore, separate or alternative embodiments are not necessarily mutually exclusive of other embodiments. Moreover, the order of blocks in process flowcharts or diagrams representing one or more embodiments of the invention does not inherently indicate any particular order and does not imply any limitations in the invention.

One objective of an embodiment of the present invention is to provide a propeller-enclosed flying apparatus with a novel air tube structure incorporating a novel airflow control dish that reduces potential bodily harm and property damage risks during an operation of the novel flying apparatus in a densely-populated environment or in another environment involving tight spaces.

Another objective of an embodiment of the present invention is to provide a novel flying apparatus that encapsulates one or more propellers inside a drone casing to enhance operational safety.

A further objective of an embodiment of the present invention is to provide a safety-enhancing and unique multi air-tube structure incorporated into the drone casing as air outtakes to produce stable lift force with the encapsulated propellers.

In addition, another objective of an embodiment of the present invention is to provide a novel flight control steering unit incorporating a novel airflow control dish, dish position motors, dish control rods, and/or springs, which are configured to control direction and altitude of the novel flying apparatus.

For the purpose of describing the invention, a term "drone" is defined as an unmanned flying apparatus, which may be remotely controlled by a user or operated autonomously based on artificial intelligence embedded in the device. A "flying apparatus," on the other hand, may be a manned aerial vehicle piloted by a human operator, or an unmanned aerial vehicle (i.e. a drone). Furthermore, an "airlifting air tube apparatus," which is described in various embodiments of the present invention, is a type of a novel flying apparatus that may be unmanned or manned.

Furthermore, for the purpose of describing the invention, a term "air tube" is defined as a pipe-like tubular structure configured to function as a forced air intake or a forced air outtake, wherein the forced air is typically provided by one or more rotating propellers exposed to the pipe-like tubular structure.

In addition, for the purpose of describing the invention, a term "airflow control steering unit" is defined as an electromechanical system configured to control and alter intake or outtake airflows among a plurality of air tubes in a flying apparatus to change directions and/or altitude of the flying apparatus. In a preferred embodiment of the invention, an airflow control steering unit comprises an airflow control dish configured to be slid into a targeted position on dish-guiding rails embedded in outtake air tubes, wherein the airflow control dish is precisely controlled by a plurality of dish control rods and/or springs, which can be dynamically adjusted (e.g. pulled, pushed, wound, or unwound) by a plurality of dish-positioning motors. When the airflow control dish is at its device-leveling or neutral position, the flying apparatus is able to hover in a stationary position, as the outtake airflows from a plurality of air tubes provide a weight distribution-compensating sustained lift force. The airflow control dish moved into a targeted position on dish-guiding rails by the swingable rod may also create a gravity pendulum-based self-stabilizing tendency to the airlifting air tube apparatus, whenever there is an external disturbance or turbulence that triggers instability to the current positioning of the apparatus. In another instance, when the airflow control dish-based steering unit deliberately alters the position of the airflow control dish from its neutral position via one or more dish-positioning motors, dish control rods, and/or springs, the amount of outtake airflow in each air tube is no longer device-leveling, thus causing a directional and/or altitude change to the flying apparatus.

In another embodiment of the invention, another electromechanical or electromagnetic airflow control steering unit, other than the unit shown and described as the preferred embodiment (i.e. FIG. 5), may be utilized to provide a controlled airflow change to the plurality of air tubes for directional and/or altitude change in the flying apparatus. Furthermore, rotational speeds of propellers may be dynamically adjusted by a remote operator on a remote controller or by an autonomous flight control unit to change the altitude of the flying apparatus.

FIG. 1 shows a top exterior view (100) of a novel airlifting air tube apparatus, in accordance with an embodiment of the invention. In a preferred embodiment of the invention, the airlifting air tube apparatus is a drone comprising an upper exterior shell (101) that includes an air intake screen or opening (103), and a lower exterior shell (105) that provides a complete enclosure to one or more propellers inside the airlifting air tube apparatus for enhanced operational safety. In the preferred embodiment, the exterior shells (101, 105) are made of plastic, carbon fibers, or other synthetic materials that are lightweight yet rigid. In other embodiments, the exterior shells (101, 105) can be made of aluminum, titanium, lightweight alloys, or other metallic materials suitable for a flying apparatus.

As shown by the top exterior view (100) of FIG. 1, the airlifting air tube apparatus is preferably a spherically-shaped device that encapsulates propellers, air intake path(s), a flight control circuitry, an airflow control steering unit, a power management circuitry, a battery pack connected to a plurality of electronic components, and a plurality of outtake air tubes that provide controlled lift force to the airlifting air tube. In another embodiment of the invention, the airlifting air tube apparatus may have exterior shell components that constitute oval, rectangular, squarely, other geometrical shape(s) suitable for a safety-enhanced drone design.

Figure 2:
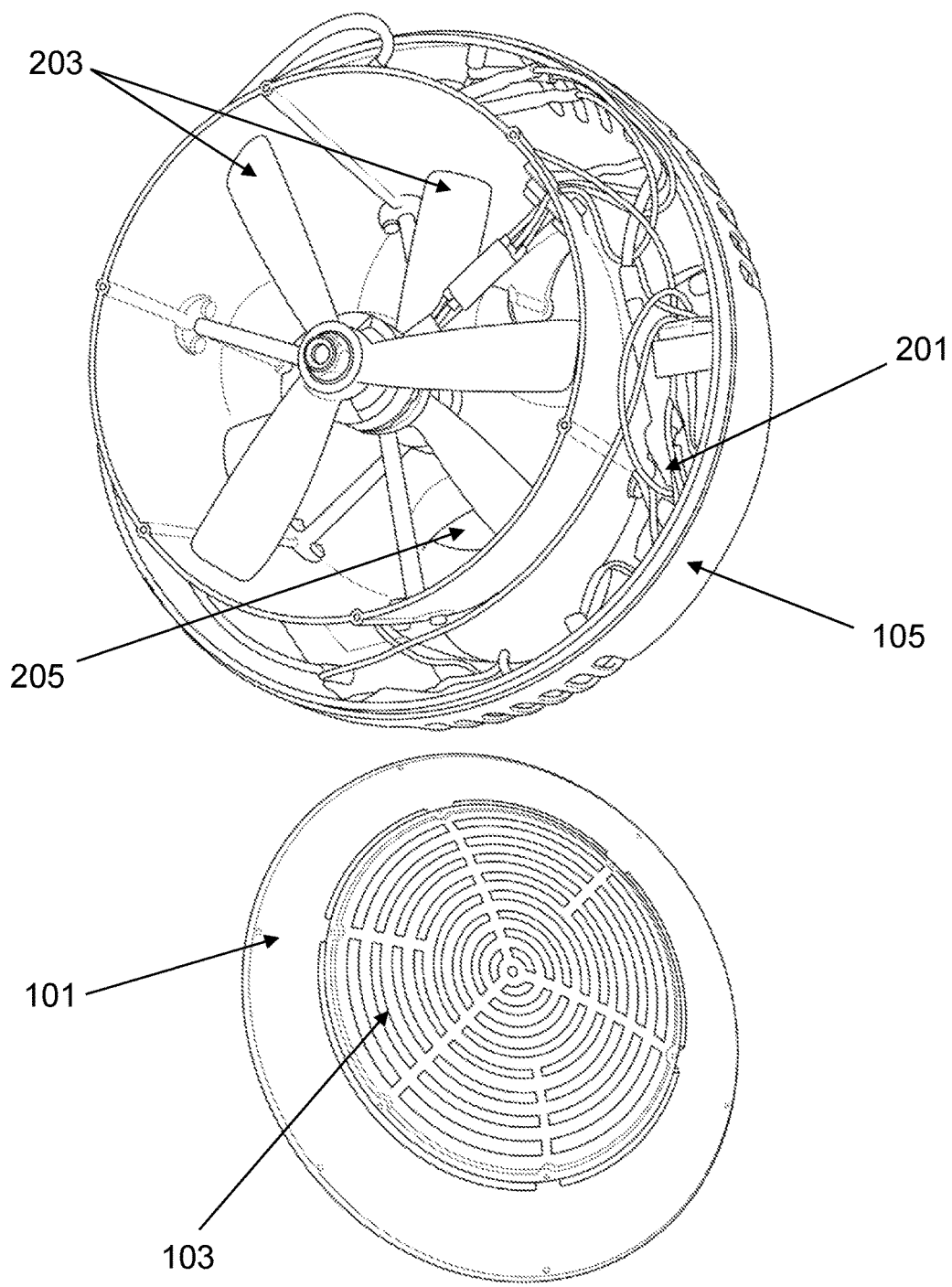
FIG. 2 shows an interior view of a novel airlifting air tube apparatus, in accordance with an embodiment of the invention.

FIG. 2 shows an interior view (200) of a novel airlifting air tube apparatus, in accordance with an embodiment of the invention. In a preferred embodiment of the invention, the interior of the airlifting air tube apparatus comprises a flight control circuitry (201) connected to a battery pack, a pair of contra-rotating propellers (203), and three outtake air tubes (205), as shown in FIG. 2. The flight control circuitry (201) is configured to control and adjust the flight behavior of the airlifting air tube apparatus by executing an embedded autonomous flight program (e.g. an autopilot program) or by receiving and processing remote flight commands from a remote control operator.

The flight control circuitry (201) typically includes a CPU, a memory unit, and a data storage to execute one or more flight control and navigational programs. Furthermore, in the preferred embodiment of the invention, various sensors, such as a gyroscope, a GPS receiver, a compass, an altimeter, and an accelerometer, may be connected to or incorporated into the flight control circuitry (201) to provide accurate flight and navigational controls. In some embodiments, a camera or a visual sensor may also be integrated into or connected to the flight control circuitry (201) to perform obstruction detection and recording of video footages.

Preferably, the flight control circuitry (201) also incorporates or is connected to a wireless data transceiver to receive and process the remote flight commands. Furthermore, the flight control circuitry (201) may incorporate or connect to an airflow control steering unit that controls and adjusts intake and/or outtake airflows to trigger a change in direction (i.e. leftward, rightward, upward, downward, etc.) of the airlifting air tube apparatus. In addition, the flight control circuitry (201) may also incorporate or connect to a power management unit that regulates the battery pack, the power supply to various electronic components in the apparatus, and the rechargeable capabilities of the battery pack, if the battery pack is rechargeable through an AC adapter or another means of an external electrical power supply.

As shown by the interior view (200) of the airlifting air tube apparatus, in the preferred embodiment of the invention, the pair of contra-rotating propellers (203) are configured to rotate in opposite orientations (i.e. contra-rotation) to cancel torque effects on the body of the apparatus, while drawing in air from the air intake screen or opening (103) and forcing the agitated air out through the three outtake air tubes (205). In other embodiments of the invention, the number of outtake air tubes (205) may be more than three, depending on desired levels of airborne stability for a drone. However, it is preferable to incorporate at least three outtake air tubes (205) in the airlifting air tube apparatus, as the steering control utilizing dynamic airflow adjustments to each outtake air tube may become less effective, if less than three outtake air tubes (205) are incorporated into the body of the airlifting air tube apparatus.

Continuing with FIG. 2, the interior view (200) of the airlifting air tube apparatus also shows the lower exterior shell (105), which at least partially contains the flight control circuitry (201), the power management unit, the battery pack, and the pair of contra-rotating propellers (203). In many embodiments of the invention, a rigid cubby space formed between the outer layer of the lower exterior shell (105) and the air intake path (i.e. 313 of FIG. 3) may serve as a desirable location to place electronic and battery components, because it is at least somewhat isolated from the air intake or outtake pathways (e.g. 313 of FIG. 3, 205). Moreover, as shown in FIG. 2, the air intake screen or opening (103) is part of the upper exterior shell (101). In some embodiments of the invention, the diameter of the air intake screen or opening (103), if circular, may be equal to the diameter of the air intake path (i.e. 313 of FIG. 3) to provide an airtight seal when the upper exterior shell (101) and the lower exterior shell (105) are held together. The airtight fitting may improve the efficiency of the forced airflow provided by the pair of contra-rotating propellers (203). Yet in other embodiments of the invention, the airtight fitting may be unnecessary for operating the airlifting air tube apparatus.

Figure 3:
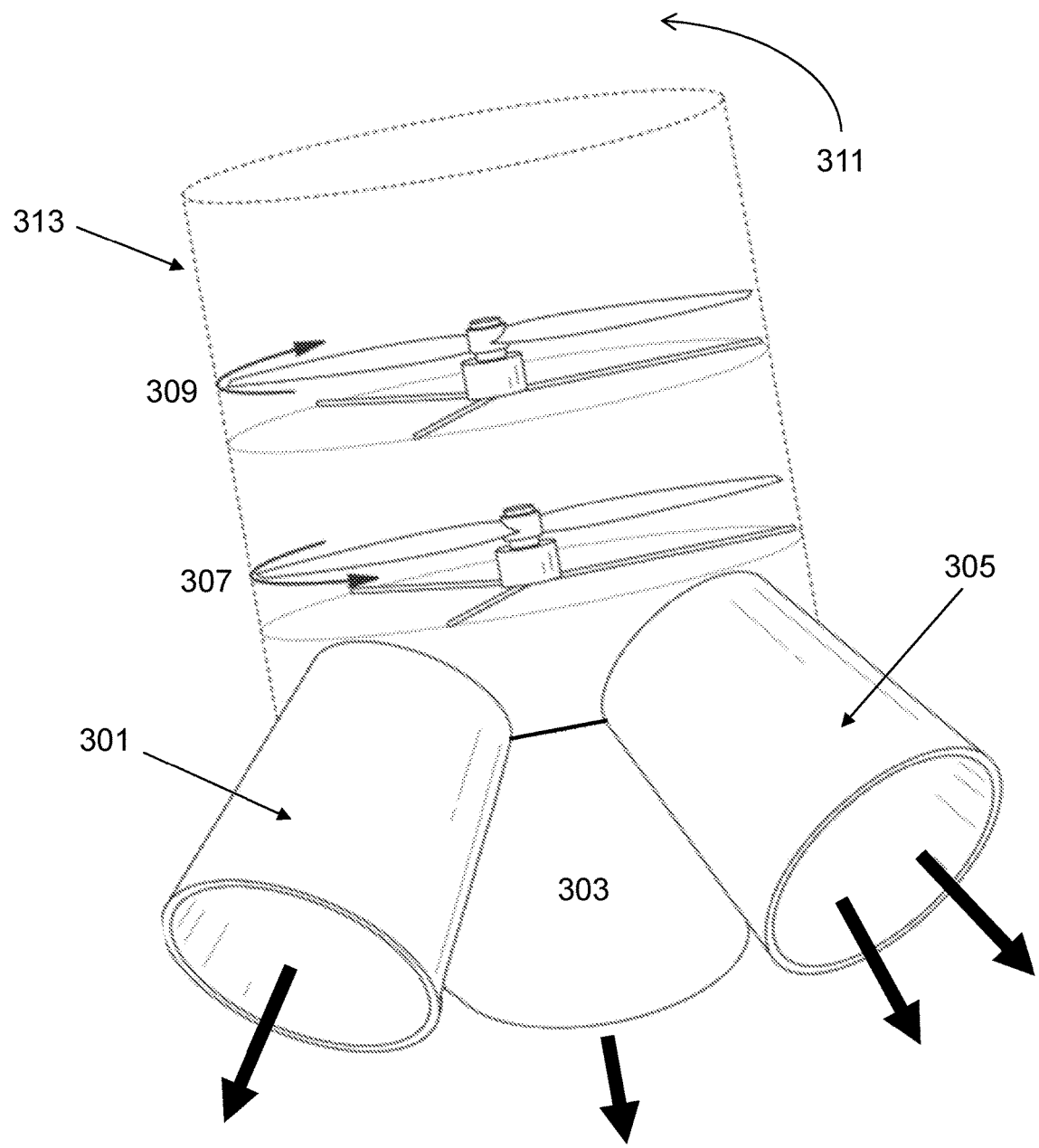
FIG. 3 shows an example of controlled steering of a novel airlifting air tube apparatus by varying outtake airflows among a plurality of air tubes, in accordance with an embodiment of the invention.

FIG. 3 shows an example (300) of controlled steering of a novel airlifting air tube apparatus by varying outtake airflows among a plurality of air tubes, in accordance with an embodiment of the invention. In this example (300), the airlifting air tube apparatus achieves directional and altitude changes (i.e. leftward, rightward, angled tilts, forward, backward, hovering, etc.) by adjusting outtake airflows on a first outtake air tube (301), a second outtake air tube (303), and a third outtake air tube (305). Preferably, there are at least three outtake air tubes (i.e. 301, 303, 305) in the airlifting air tube apparatus to provide lift force by forcing air out of each outtake air tube and by varying the amount of air outtake with an airflow control steering component, which is further elaborated in FIGS. 4-8.

In the preferred embodiment of the invention, an outtake air tube is a pipe-like tubular structure configured to function as a forced air outtake, wherein the forced air is typically provided by a pair of contra-rotating propellers (307, 309) that draw in outside air via an air intake path (313). In one embodiment, each propeller (307 or 309) is connected to a propeller motor configured to rotate each propeller independently from each other at a desirable speed controlled and determined by the flight control circuitry (201). In another embodiment, the pair of contra-rotating propellers is connected to a single electrical motor that rotates both of the contra-rotating propellers. Typically, the propellers are electrically powered by rechargeable batteries.

In the example (300) as shown in FIG. 3, the airlifting air tube apparatus steers counterclockwise and leftward (311), as more air is expelled (i.e. per second, or per same amount of time) from the third outtake air tube (305), while the first outtake air tube (301) and the second outtake air tube (303) expel less amount of air compared to the third outtake air tube (305).

In another example, if the first outtake air tube (301) expels more air (i.e. per second, or per same amount of time) than the second outtake air tube (303) and the third outtake air tube (305), then the airlifting air tube apparatus will steer clockwise or rightward. Yet in another example, if the first outtake air tube (301) and the third outtake air tube (305) expel more air (i.e. per second, or per same amount of time) than the second outtake air tube (303), then the airlifting air tube apparatus will tilt rearward and/or move rearward.

Moreover, in another example, if the second outtake air tube (303) expels more air (i.e. per second, or per same amount of time) than the first outtake air tube (301) and the third outtake air tube (305), then the airlifting air tube apparatus will tilt forward and/or move forward. Furthermore, in another example, if all of the outtake air tubes (301, 303, 305) expel equal or weight distribution-compensated amount of air per second or per same amount of time, the airlifting air tube apparatus will hover in a stationary position, or change its altitude vertically based on the current rotational speeds of the pair of contra-rotating propellers (307, 309).

Continuing with FIG. 3, the air intake path (313) is typically surrounded by a rigid wall to provide a sealed air intake pathway to the pair of contra-rotating propellers (307, 309). Furthermore, the blade angle of the first propeller (307) and the blade angle of the second propeller (309) may be inversely tilted from each other to provide a consistent upward lift force (i.e. a directionally unified forced air movement), even as each propeller rotates in opposite orientation to counteract the torque effect caused by propeller rotations.

Moreover, in an alternate embodiment of the invention, one or more propellers may be located inside each of the three or more outtake air tubes, instead of being placed in the general air intake path (313), to provide a direct airflow control to each outtake air tube by controlling the speed and the orientation of each of the outtake air tube-embedded propellers. In such alternate embodiments of the invention, an airflow control dish-based steering unit, as described in detail in association with FIGS. 4-8, may not be necessary because a direct steering control is achieved by the outtake air tube-embedded propellers.

Figure 4:
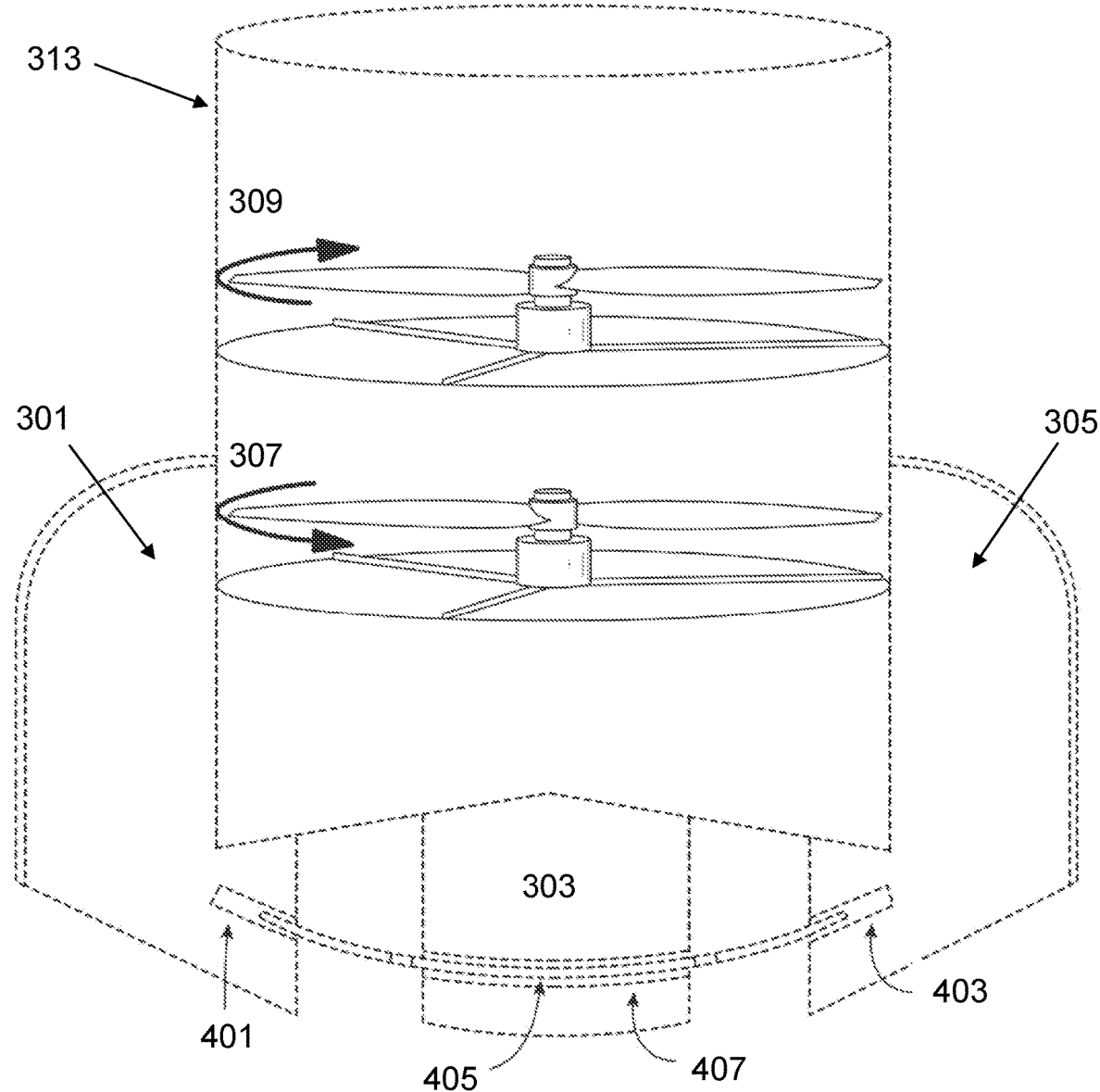
FIG. 4 shows a lateral view of an airflow control dish-based steering unit in a novel airlifting air tube apparatus, in accordance with an embodiment of the invention.

FIG. 4 shows a lateral view of an airflow control dish-based steering unit (400) in a novel airlifting air tube apparatus, in accordance with an embodiment of the invention. FIG. 4 also shows the air intake path (313) and the pair of contra-rotating propellers (307, 309) that provide a lift force to the novel airlifting air tube apparatus. An airflow control steering unit is generally described herein as an electromechanical system configured to control and alter intake or outtake airflows among a plurality of air tubes in a flying apparatus to change directions and/or altitude of the flying apparatus. In this particular embodiment as shown in FIG. 4, the airflow control dish-based steering unit (400) is one type of the airflow control steering unit.

The airflow control dish-based steering unit (400) comprises an airflow control dish (405) located in the center or close to the center of the three outtake air tubes (301, 303, 305), one or more dish-guiding rails (401, 403, 407), dish-positioning motors, and dish control rods or springs. In the preferred embodiment of the invention, the airflow control dish (405) is configured to move along one or more dish-guiding rails (e.g. 401, 403, 407), which are typically embedded in each outtake air tube. A dish-guiding rail (401, 403, or 407) per each outtake air tube (e.g. 301, 303, or 305) allows the airflow control dish (405) to move to a targeted position along the dish-guiding rail to change the balance in the amount of air outflow from each outtake air tube, which in turn enables a controlled and targeted change of direction for the novel airlifting air tube apparatus.

In the preferred embodiment of the invention, the airflow control dish (405) may be suspended by a swingable rod, which provides an additional stability for the airflow control dish (405) to be positioned in a natural gravity pendulum state or precisely controlled by a plurality of dish control rods and/or springs that are dynamically adjusted (e.g. pulled, pushed, wound, or unwound) by a plurality of dish-positioning motors along the dish-guiding rails that are embedded in the outtake air tubes. The airflow control dish suspended in air by the swingable rod may provide a gravity pendulum-based self-stabilizing tendency to the airlifting air tube apparatus, whenever there is an external disturbance or turbulence that triggers instability to the current positioning of the apparatus.

In an alternate embodiment of the invention, the airflow control dish (405) does not utilize the swingable rod and can still achieve substantial stability in a neutral hovering position of the novel airlifting air tube apparatus. Furthermore, in some embodiments of the invention, the airflow control dish (405) may utilize electromagnetic forces or another stabilizing mechanism that causes a controlled movement of the airflow control dish (405), even when dish-positioning motors, dish control rods, and/or springs are not utilized.

Figure 5:
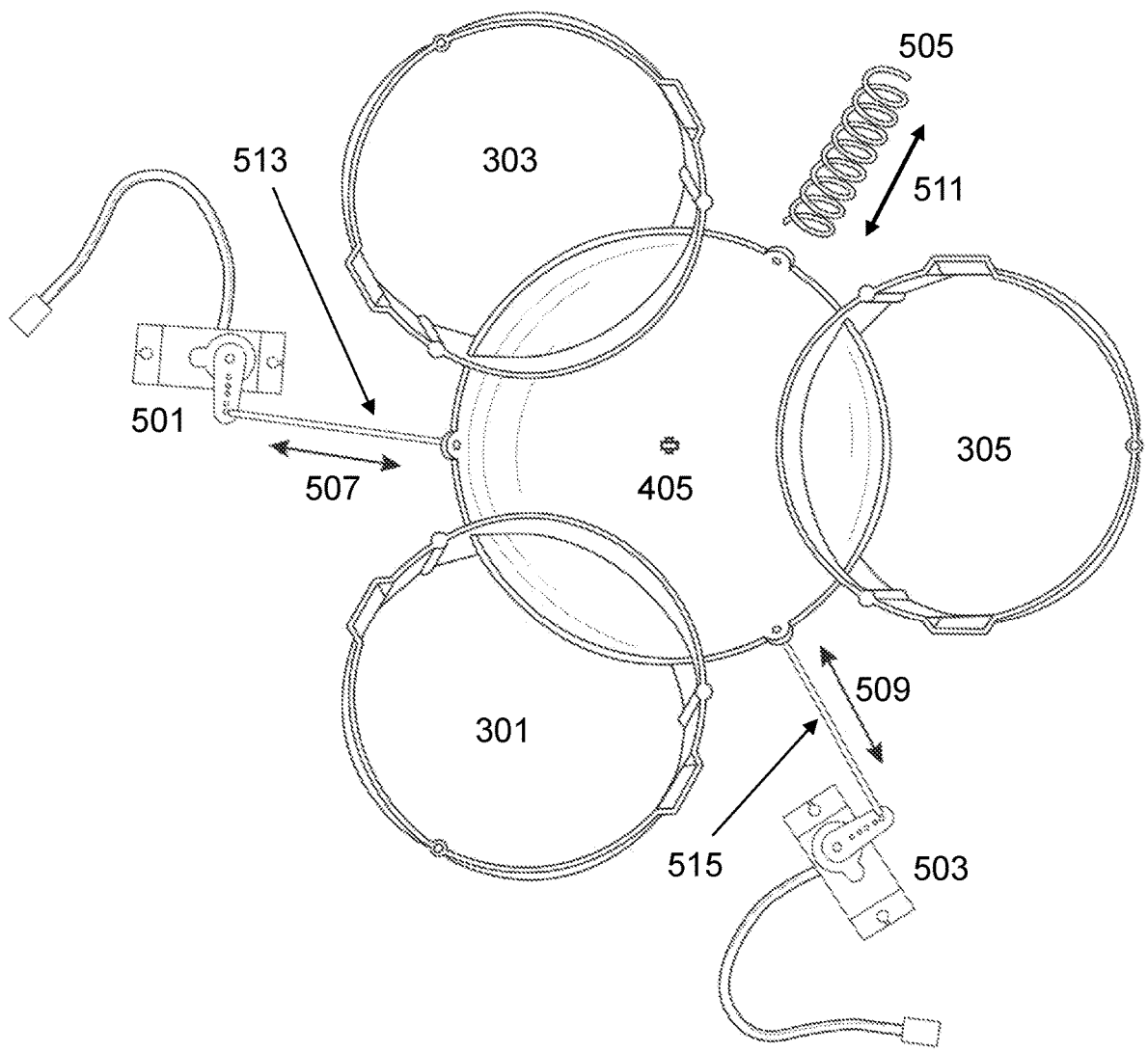
FIG. 5 shows an airflow control dish-based steering unit controlled by dish-positioning motors, dish control rods, and/or springs, in accordance with an embodiment of the invention.
Figure 7:
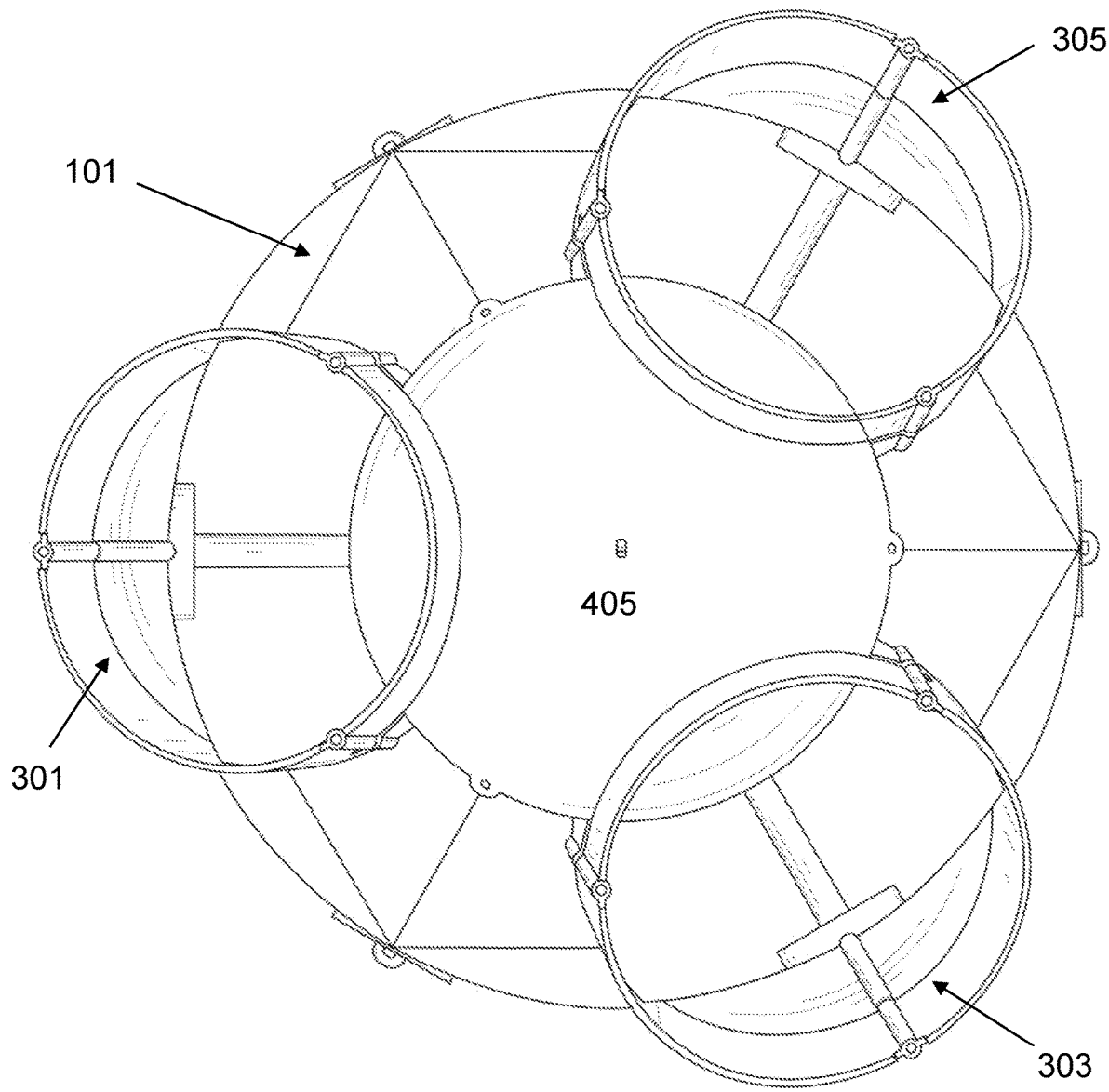
FIG. 7 shows a bottom-up view of an airflow control dish in a neutral hovering position for the novel airlifting air tube apparatus, in accordance with an embodiment of the invention.

In the preferred embodiment of the invention, the airflow control dish (405) is at its "device-leveling," "hovering," or "neutral" position, if the airflow control dish (405) is equidistant from each outtake air tube, as shown in FIGS. 4, 5, and 7, and if the airlifting air tube apparatus exhibits a balanced and even weight distribution relative to locations of the outtake air tubes. On the other hand, if the airlifting air tube apparatus instead exhibits an uneven weight distribution relative to the specific locations of the outtake air tubes, then the airflow control dish (405) can be configured to achieve its "neutral" position via a gravity pendulum movement to self-stabilize the airlifting air tube apparatus, and if necessary, by artificially differentiating the airflow out of each outtake air tube by repositioning the airflow control dish (405). For example, an outtake air tube located closer to the heavier side of the airlifting air tube apparatus can expel higher-pressure air than outtake air tube(s) located farther way from the heavier side, which enables leveling and stabilization of the airlifting air tube apparatus. The repositioning of the airflow control dish (405) can be achieved by artificially pulling or pushing the airflow control dish (405) along the dish-guiding rail (e.g. 401, 403, 407 in FIG. 4, or 801, 803, 805, 807 in FIG. 8) with dish-control rods and/or springs that are controlled by dish-positioning motors, as demonstrated, for example, in FIG. 5.

When the airflow control dish (405) is at its neutral position, the airlifting air tube apparatus is able to hover in a stationary position. The airflow control dish, if suspended in air by a swingable rod as in one embodiment, also creates a gravity pendulum-based self-stabilizing tendency to the airlifting air tube apparatus, whenever there is an external disturbance or turbulence that triggers instability to the current positioning of the apparatus. On the other hand, when the airflow control dish-based steering unit deliberately alters the "neutral" position of the airflow control dish via one or more dish-positioning motors, dish control rods, and/or springs, the amount of outtake airflow in each outtake air tube is no longer at its device-leveling state, thus causing a directional and/or altitude change to the airlifting air tube apparatus.

FIG. 5 shows an airflow control dish-based steering unit (500), which is controlled by dish-positioning motors (501, 503), dish control rods (513, 515), and/or springs (505), in accordance with an embodiment of the invention. The airflow control dish-based steering unit (500) includes the airflow control dish (405). In some embodiments of the invention, the airflow control dish (405) is suspended by a swingable rod attached to a rigid structure near outtake air tubes. In other embodiments of the invention, the novel airlifting air tube apparatus simply does not utilize the swingable rod for the airflow control dish (405). If utilized, the swingable rod may be made of metals, rubber, or synthetic materials. Similarly, the airflow control dish (405) may be made of metals, rubber, or synthetic materials, and is capable of at least partially blocking the airflow from one or more outtake air tubes (301, 303, 305). In the preferred embodiment of the invention, each outtake air tube incorporates a dish-guiding rail, which serves as a stable pathway for the airflow control dish (405) to move to a targeted position for controlled steering of the novel airlifting air tube apparatus. The controlled steering of the novel airlifting air tube apparatus is achieved by changing the balance of the airflow among the plurality of outtake air tubes (301, 303, 305) with the airflow control dish (405).

As shown in FIG. 5, in the preferred embodiment of the invention, the airflow control dish (405) is configured to be pulled or pushed by dish control rods (513, 515) and/or springs (505) that can be moved, wound, or unwound by one or more corresponding dish-positioning motors (501, 503). In this example, each dish control rod and/or spring is approximately 120 degrees separated from an adjacent dish control rod and/or spring. In another embodiment of the invention, the degree of separation between each dish control rod and/or spring may be reduced if more than three dish-positioning motors and more than three sets of dish control rods and/or springs are utilized. Reducing such degrees of separation between each dish control rod and/or spring may enable finer angular adjustments of the airflow control dish (405), which in turn produces more precise flight control characteristics for the airlifting air tube apparatus.

In the example as shown in FIG. 5, the airflow control dish (405) may be moved, pulled, or pushed by one or more dish control rods (513, 515) and/or springs (505) controlled by one or more dish-positioning motors (501, 503), which in turn causes a targeted repositioning of the airflow control dish (405) along a movement axis (i.e. 507, 509, or 511) between two or more outtake air tubes (301, 303, 305). For example, if the airflow control dish (405) moves towards a first dish-positioning motor (501) via a first movement axis (507), more airflow is given to the third outtake air tube (305) while less airflow is given to the first and the second outtake air tubes (301, 303), which in turn creates a leftward tilt to the novel airlifting air tube apparatus. In another example, if the airflow control dish (405) moves away from the first dish-positioning motor (501) via the first movement axis (507), more airflow is given to the first and the second outtake air tubes (301, 303) while less airflow is given to the third outtake air tube (305), thus creating a rightward tilt to the novel airlifting air tube apparatus. The airflow control dish (405) is also configured to move along a second movement axis (509) and/or a third movement axis (511) to achieve a desired steering control of the novel airlifting air tube apparatus.

By utilizing a change in balance of the air outflows through the three outtake air tubes (301, 303, 305) with a targeted positioning of the airflow control dish (405), a desired steering control of the novel airlifting air tube apparatus can be achieved along three or more movement axes (i.e. 507, 509, 511), as shown in FIG. 5. In another embodiment of the invention, another electromechanical or electromagnetic airflow control steering unit, other than the unit shown and described as the preferred embodiment in FIG. 5, may be utilized to provide a controlled airflow change to the plurality of air tubes for directional and/or altitude changes in the airlifting air tube apparatus. Furthermore, rotational speeds of propellers may be dynamically adjusted by a remote operator on a remote controller or by an autonomous flight control unit to change the altitude of the airlifting air tube apparatus.

Figure 6:
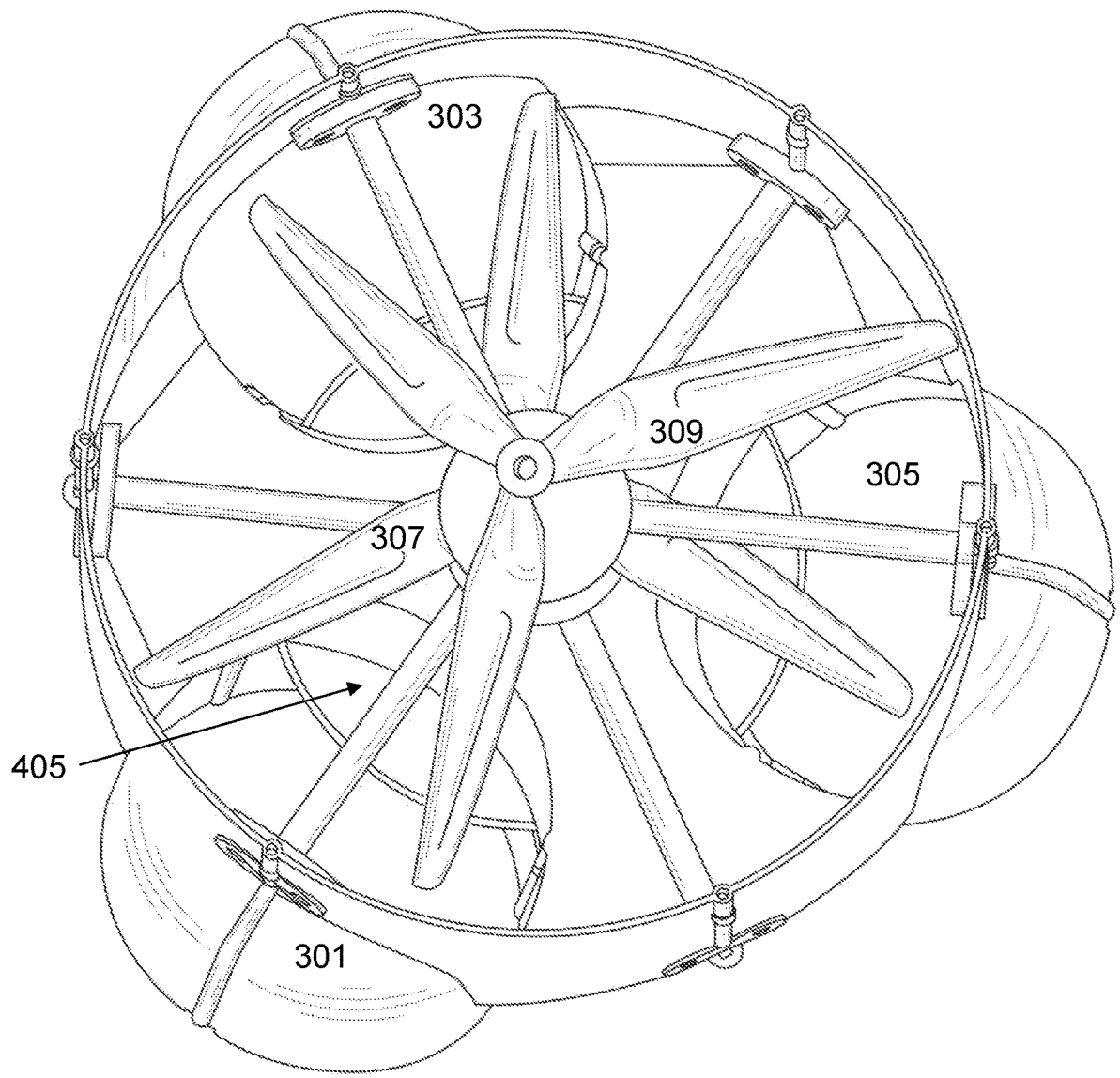
FIG. 6 shows a top-down interior view of a novel airlifting air tube apparatus integrating an airflow control dish, in accordance with an embodiment of the invention.

FIG. 6 shows a top-down interior view (600) of a novel airlifting air tube apparatus integrating an airflow control dish (405), in accordance with an embodiment of the invention. As shown in this top-down interior view (600) of the novel airlifting air tube apparatus, the airflow control dish (405) is placed or suspended below two contra-rotating propellers (307, 309) and above three outtake air tubes (301, 303, 305). As described previously in conjunction with FIGS. 4 and 5, the airflow control dish (405) is configured to provide a controlled steering for the novel airlifting air tube by moving along one or more movement axes between the outtake air tubes, which in turn changes the balance in the amount of air outflow from each outtake air tube.

In the preferred embodiment of the invention, the airflow control dish (405) is at its "device-leveling," "hovering," or "neutral" position, if the airflow control dish (405) is equidistant from each outtake air tube, and if the airlifting air tube apparatus exhibits a balanced and even weight distribution relative to locations of the outtake air tubes. On the other hand, if the airlifting air tube apparatus instead exhibits an uneven weight distribution relative to the specific locations of the outtake air tubes, then the airflow control dish (405) can be configured to achieve its device-leveling "neutral" position via a gravity pendulum movement to self-stabilize the airlifting air tube apparatus, and if necessary, by artificially differentiating the airflow out of each outtake air tube by repositioning the airflow control dish (405). For example, an outtake air tube located closer to the heavier side of the airlifting air tube apparatus can expel higher-pressure air than outtake air tube(s) located farther way from the heavier side, which enables leveling and stabilization of the airlifting air tube apparatus. The repositioning of the airflow control dish (405) can be achieved by artificially pulling or pushing the airflow control dish (405) with dish-position rods and/or springs that are controlled by dish-positioning motors.

When the airflow control dish (405) is at its neutral position, the airlifting air tube apparatus is able to hover in a stationary position. On the other hand, when the airflow control dish-based steering unit deliberately alters the position of the airflow control dish via one or more dish-positioning motors, dish control rods, and/or springs, the amount of outtake airflow in each outtake air tube is no longer at its device-leveling or neutral position, thus causing a directional and/or altitude change to the airlifting air tube apparatus.

FIG. 7 shows a bottom-up view (700) of an airflow control dish (405) in a neutral hovering position for the novel airlifting air tube apparatus, in accordance with an embodiment of the invention. The bottom-up view (700) of the airflow control dish (405) also shows three outtake air tubes (301, 303, 305), which are partially enclosed by the upper exterior shell (101) while the lower exterior shell (105) is removed from the apparatus from the bottom-up view (700) for demonstrative visual clarity, in accordance with an embodiment of the invention.

In the embodiment of the invention as shown in FIG. 7, the airflow control dish (405) is at its "device-leveling," "hovering," or "neutral" position, if the airflow control dish (405) is equidistant from each outtake air tube, and if the airlifting air tube apparatus exhibits a balanced and even weight distribution relative to locations of the outtake air tubes. When the airflow control dish (405) is at its neutral position, the airlifting air tube apparatus that exhibits the balanced and even weight distribution relative to the locations of the outtake air tubes is able to hover in a stationary position, as equal amounts of outtake airflow are provided to each outtake air tube among a plurality of outtake air tubes. When the airflow control dish-based steering unit deliberately alters the position of the airflow control dish from its neutral position via one or more dish-positioning motors, dish control rods, and/or springs, the amount of outtake airflow in each outtake air tube is no longer device-leveling, thus causing a directional and/or altitude change to the airlifting air tube apparatus.

Figure 8:
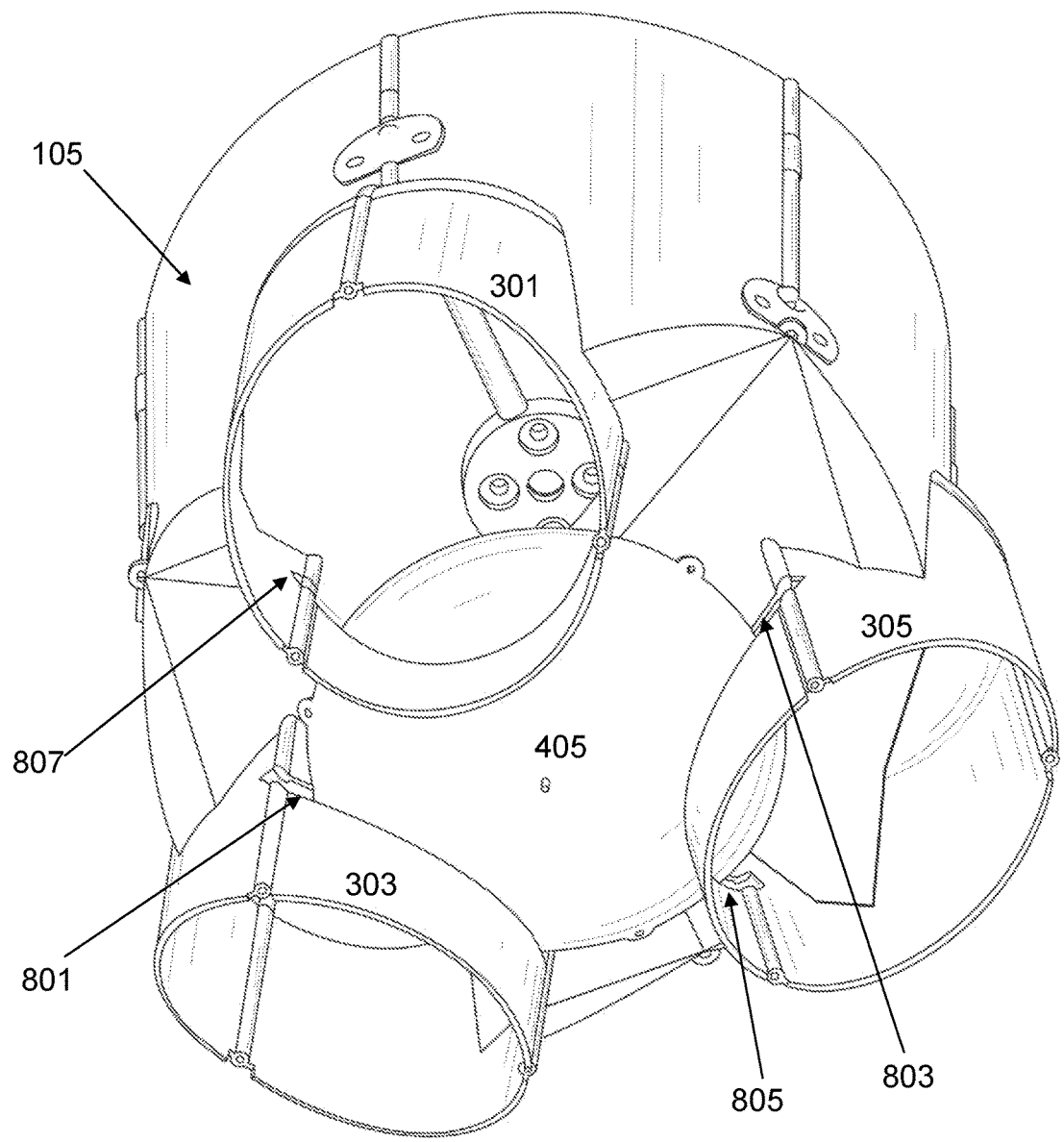
FIG. 8 shows a perspective bottom-up view of an airflow control dish integrated in the airflow control dish-based airlifting air tube apparatus, in accordance with an embodiment of the invention.

FIG. 8 shows a perspective bottom-up view (800) of an airflow control dish (405) integrated in the airflow control dish-based airlifting air tube apparatus, in accordance with an embodiment of the invention. In this example, the airflow control dish (405) is at least partially encased or encapsulated by the lower exterior shell (105) of the airlifting air tube apparatus, wherein the three outtake air tubes (301, 303, 305) are openly exposed to expel air agitated by enclosed propellers. As illustrated in this perspective bottom-up view (800), each outtake air tube (301, 303, or 305) uniquely incorporates a dish-guiding rail (801, 803, 805, or 807) on a sidewall of each outtake air tube to provide a stabilized pathway and one or more axes of movements for the airflow control dish (405).

Various embodiments of the present invention, as described above, provide several advantages over conventional flying apparatus and drone designs. For example, the airlifting air tube apparatus in accordance with an embodiment of the present invention provides a propeller-enclosed flying apparatus with a novel air tube structure that reduces potential bodily harm and property damage risks during an operation of the novel flying apparatus in a densely-populated environment or in another environment involving tight spaces.

Another advantage of an embodiment of the present invention is a complete encapsulation and containment of one or more contra-rotating propellers inside a drone casing to enhance operational safety while minimizing the overall footprint of the flying apparatus.

Furthermore, another advantage of an embodiment of the present invention is providing a safety-enhancing and unique multi air-tube structure incorporated into a drone casing as a plurality of air outtakes to produce stable lift force.

Moreover, another advantage of an embodiment of the present invention is providing a novel flight control steering unit with a novel airflow control dish that can finely change the direction and/or the altitude of the novel flying apparatus.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. An airlifting air tube apparatus comprising:
   one or more propellers connected to one or more propeller motors, all of which are encapsulated by an exterior shell of the airlifting air tube apparatus, wherein the one or more propeller motors are configured to rotate the one or more propellers;
   a flight control circuitry configured to control rotational speeds and rotating orientations of the one or more propellers;
   an air intake path physically defined by an air intake opening on the exterior shell and an internal air passage leading to the one or more propellers encapsulated inside the airlifting air tube apparatus;
   three or more outtake air tubes located on a bottom surface of the airlifting air tube apparatus, wherein the three or more outtake air tubes expel air drawn in and agitated by the one or more propellers and provide a sufficient lift force to enable the airlifting air tube apparatus to operate as a controlled flying device, and wherein adjusting a magnitude of expelled air in each of the three or more outtake air tubes triggers a change in direction or altitude during flight; and
   an airflow control dish-based steering unit comprising an airflow control dish and a dish-guiding rail embedded in each outtake air tube, wherein the airflow control dish is configured to move along an axis of movement guided by the dish-guiding rail embedded in each outtake air tube to reduce or increase the magnitude of expelled air in each of the three or more outtake air tubes, which in turn provides a controlled steering of the airlifting air tube apparatus.

2. The airlifting air tube apparatus of claim 1, wherein the airflow control dish-based steering unit further comprises one or more dish-positioning motors, and at least one of dish control rods connected to the airflow control dish and the one or more dish-positioning motors, wherein a current position of the airflow control dish is adjusted by pushing or pulling of the dish control rods with the one or more dish-positioning motors.

3. The airlifting air tube apparatus of claim 1, further comprising a battery pack connected to the flight control circuitry and the one or more propeller motors to provide electrical power to electronic components contained in the airlifting air tube apparatus.

4. The airlifting air tube apparatus of claim 1, further comprising a power management unit connected to or incorporated into the flight control circuitry.

5. The airlifting air tube apparatus of claim 1, wherein the exterior shell is made of plastic, metallic alloys, carbon fibers, or another lightweight material.

6. The airlifting air tube apparatus of claim 1, wherein the exterior shell has a spherical shape and is divided into an upper exterior shell containing the air intake opening and a lower exterior shell at least partially containing the flight control circuitry, the one or more propellers, the one or more propeller motors, and the three or more outtake air tubes.

7. The airlifting air tube apparatus of claim 1, wherein the flight control circuitry is further connected to a wireless data transceiver to receive remote-controlled commands from a remote operator.

8. The airlifting air tube apparatus of claim 1, wherein the one or more propellers are a pair or multiple pairs of contra-rotating propellers.

9. The airlifting air tube apparatus of claim 6, wherein the flight control circuitry is installed in a rigid cubby space formed between an outer layer of the lower exterior shell and an inner layer surrounding the air intake path, wherein the rigid cubby space is at least partially isolated from agitated airflow generated by the one or more propellers.

* * * * *